(12) United States Patent
Jadidian et al.

(10) Patent No.: US 10,418,863 B1
(45) Date of Patent: Sep. 17, 2019

(54) CHARGING SYSTEM

(71) Applicant: Apple Inc., Cupertino, CA (US)

(72) Inventors: Jouya Jadidian, Saratoga, CA (US);
Steven W. Cabral, San Jose, CA (US);
Vaneet Pathak, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/212,411

(22) Filed: Dec. 6, 2018

Related U.S. Application Data

(63) Continuation of application No. 15/265,359, filed on Sep. 14, 2016, now abandoned.

(60) Provisional application No. 62/233,891, filed on Sep. 28, 2015.

(51) Int. Cl.
| | | |
|---|---|---|
| *H02J 50/90* | (2016.01) | |
| *H02J 50/10* | (2016.01) | |
| *H02J 7/00* | (2006.01) | |
| *H02J 50/60* | (2016.01) | |
| *H02J 7/02* | (2016.01) | |

(52) U.S. Cl.
CPC .............. *H02J 50/90* (2016.02); *H02J 7/025* (2013.01); *H02J 50/10* (2016.02); *H02J 50/60* (2016.02)

(58) Field of Classification Search
CPC .. H02J 50/90; H02J 50/10; H02J 50/60; H02J 7/025; B60L 9/00; B60L 5/38
USPC ......... 320/108, 103, 104; 307/150; 180/168, 180/199; 191/10, 22 R
See application file for complete search history.

(56) References Cited

U.S. PATENT DOCUMENTS

| | | |
|---|---|---|
| 3,897,692 A | 8/1975 | Lehberger |
| 4,736,826 A * | 4/1988 | White .................. B25J 5/007 191/12.2 A |
| 5,246,180 A | 9/1993 | Berry et al. |
| 5,617,003 A | 4/1997 | Odachi et al. |
| 6,357,070 B1 | 3/2002 | Venard et al. |
| 6,651,566 B2 | 11/2003 | Stephan et al. |
| 7,421,321 B2 | 9/2008 | Breed et al. |
| 9,096,138 B2 | 8/2015 | Morita |
| 9,238,416 B2 | 1/2016 | Alford et al. |
| 9,365,104 B2 | 6/2016 | Ichikawa |

(Continued)

FOREIGN PATENT DOCUMENTS

DE 102013218471 3/2015

OTHER PUBLICATIONS

Chen M. et al., Chinese Patent Document No. CN 204652019 U, published Sep. 16, 2015, 3 pages.

*Primary Examiner* — Phallaka Kik
(74) *Attorney, Agent, or Firm* — Treyz Law Group, P.C.; G. Victor Treyz; Michael H. Lyons

(57) ABSTRACT

A mobile charging device may be used to move a battery or a power cord to a target device. The target device may be a vehicle or other equipment with a battery. Power from the power cord or battery in the charging device may be used to provide power to the target device to recharge the battery in the target device. The charging device may couple a power cord to the target device, may couple a connector in the charging device to the target device, or may use a wireless power transfer element such as a coil antenna to transfer power wirelessly to the target device. Sensors may be used to facilitate alignment between the charging device and target device. Sensors may also be used to dynamically detect and avoid foreign objects in the path of the charging device.

20 Claims, 13 Drawing Sheets

(56) References Cited

U.S. PATENT DOCUMENTS

| | | |
|---|---|---|
| 9,379,571 B2 | 6/2016 | Boyer et al. |
| 9,481,258 B2 | 11/2016 | Niizuma |
| 9,779,365 B2 | 10/2017 | Smullin et al. |
| 10,145,697 B2 * | 12/2018 | Paek .................. G01C 21/3438 |
| 10,178,933 B2 * | 1/2019 | Lee ....................... A47L 9/2873 |
| 10,239,467 B2 * | 3/2019 | LaFargue ............. H04B 1/3877 |
| 2001/0029641 A1 | 10/2001 | Uratani et al. |
| 2002/0174506 A1 | 11/2002 | Wallach et al. |
| 2003/0173173 A1 | 9/2003 | Stephan et al. |
| 2003/0193476 A1 | 10/2003 | Lu |
| 2005/0093378 A1 | 5/2005 | Ohishi |
| 2005/0281641 A1 | 12/2005 | Maynard et al. |
| 2009/0178895 A1 | 7/2009 | Vannest |
| 2010/0320018 A1 | 12/2010 | Gwozdek |
| 2010/0324379 A1 | 12/2010 | Clark et al. |
| 2011/0140658 A1 | 6/2011 | Outwater et al. |
| 2011/0254503 A1 | 10/2011 | Widmer et al. |
| 2012/0032635 A1 | 2/2012 | Prosser |
| 2013/0154553 A1 | 6/2013 | Steele |
| 2014/0015312 A1 | 1/2014 | Niizuma |
| 2014/0191030 A1 | 7/2014 | Reineccius |
| 2014/0197791 A1 | 7/2014 | Kaneyasu |
| 2014/0217966 A1 | 8/2014 | Schneider |
| 2014/0253030 A1 | 9/2014 | Moon |
| 2015/0028804 A1 | 1/2015 | Nakashima |
| 2015/0047951 A1 | 2/2015 | Trebbi et al. |
| 2015/0077045 A1 | 3/2015 | Harris |
| 2015/0167340 A1 | 6/2015 | Niizuma |
| 2015/0239354 A1 | 8/2015 | Gorai et al. |
| 2015/0283909 A1 | 10/2015 | Ichikawa et al. |
| 2015/0371768 A1 | 12/2015 | Graham et al. |
| 2016/0009530 A1 | 1/2016 | Teruzzi |
| 2016/0014959 A1 | 1/2016 | Atsumi |
| 2016/0028267 A1 | 1/2016 | Lee et al. |
| 2016/0189507 A1 | 6/2016 | Rayner |
| 2016/0311378 A1 * | 10/2016 | LaFargue ............. H04B 1/3877 |
| 2017/0047780 A1 | 2/2017 | Byrne |
| 2017/0110911 A1 | 4/2017 | Bossetti et al. |
| 2017/0132696 A1 | 5/2017 | Haparnas et al. |
| 2018/0271344 A1 * | 9/2018 | Han ....................... A47L 9/2842 |
| 2018/0310146 A1 * | 10/2018 | Levy .................... G08G 1/0112 |

* cited by examiner

CHARGING SYSTEM

CROSS-REFERENCE TO RELATED APPLICATIONS

This application is a continuation of U.S. Non-Provisional patent application Ser. No. 15/265,359, filed Sep. 14, 2016, which claims the benefit of U.S. Provisional Patent Application No. 62/233,891, filed Sep. 28, 2015, each of which is hereby incorporated by reference herein in its entirety.

BACKGROUND

This relates generally to power transfer systems and, more particularly, to systems that transfer power to charge batteries.

It may be desirable to transfer power between a source of power and equipment that requires power. In some systems, a user must manually plug a power cable into equipment that requires power. In other systems, a user must align equipment to be powered with a wireless charging source. These types of systems can be cumbersome and inefficient. For example, systems may be prone to misalignment, operator error, and other concerns that can make it difficult or impossible to provide power as efficiently as desired.

It would therefore be desirable to be able to provide improved systems for transferring power to equipment that uses power.

SUMMARY

Mobile equipment such as a mobile robotic charging device may be used to move a battery or a power cord to a target device. The target device may be equipment with a battery. Power from the power cord or battery in the charging device may be used to provide power to the target device to recharge the battery in the target device.

The charging device may couple a power cord to the target device, may couple a connector in the charging device to the target device, or may use a wireless power transfer element such as a coil antenna to transfer power wirelessly to the target device.

Sensors and other components may be used to facilitate alignment between the charging device and target device. Sensors and other components may, for example, be used to align a power connector or wireless power transfer element to the target device. Sensors and other components may also be used to dynamically detect foreign objects in the path of the charging device, so that the charging device can take appropriate corrective action.

A cost function may be used in evaluating different potential routes for the path that charging device takes to the target device. The cost function may take into account that certain areas in the vicinity of the target device are prohibited or are preferred.

DETAILED DESCRIPTION

It may be desirable to use a computer-controlled mobile robot or other mobile equipment to provide power to target electronic equipment. The target equipment may be provided with power wirelessly or using a wired path and may sometimes be referred to as a target device. Power may be used to recharge a battery in the target device or to power other circuitry in the target device, so the mobile equipment may sometimes be referred to as a charging device or charging equipment. The target device may be a computer or other electronic device, may be an electric vehicle or other mobile electronic equipment, may be an appliance, may be lighting or other stationary electronic equipment, or may be any other suitable electronic equipment. Configurations in which the target device is an electric vehicle and in which power is provided to recharge a battery in the vehicle may sometimes be described herein as an example.

Figure 1:
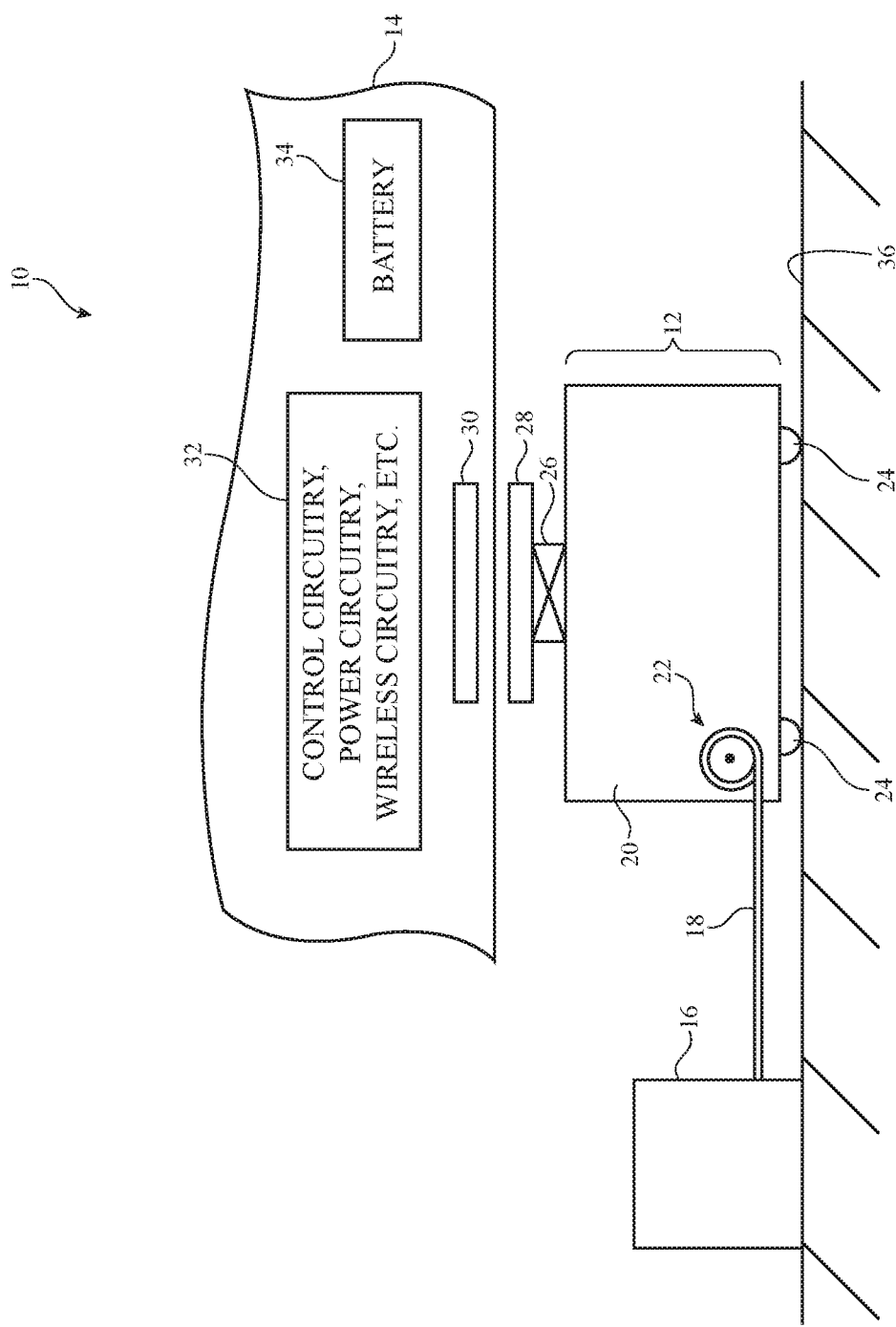
FIG. 1 is a diagram of a target device that may consume power and a charging device for use in providing power to the target device in accordance with an embodiment.

An illustrative system that includes a target device and a charging device for providing power to the target device is shown in FIG. 1. As shown in FIG. 1, target device 14 may be provided with power using a system such as system 12. System 12 may include a mobile unit (robot) such as charging device 20 and a base station such as base station 16.

Target device 14 (e.g., a vehicle, etc.) may contain a battery such as battery 34. Target device 14 may also contain circuitry 32 for controlling the operation of target device 14. For example, in scenarios in which target device 14 is an electric vehicle, control circuitry in circuitry 32 may be used in controlling functions such as steering, braking, acceleration and controlling other vehicle functions. Circuitry 32 may also include power circuitry for use in recharging battery 34. The power circuitry may be used in delivering power from a wired source to battery 34 or may, as shown in FIG. 1 be used in delivering power from a wireless component such as wireless power transfer element 30 to battery 34.

Wireless power transfer element 30 (sometimes referred to as a wireless power transmitter element) may be wirelessly coupled to a corresponding wireless power transfer element (sometimes referred to as a wireless power receiver element) such as element 28 in equipment 20. Wireless power may be transferred using inductive techniques, capacitively coupled capacitor plates, near-field coupled antennas operating at microwave frequencies or other frequencies, or other wireless power transfer techniques. With one illustrative configuration, which may sometimes be described herein as an example, wireless power transfer elements 28 and 30 are inductively coupled (near-field coupled) coils (e.g., loop antennas). Other types of wireless power transfer elements may be used, if desired.

Charging device 20 may include wheels 24 or other structures that allow charging device 20 to travel along a surface such as surface 36. Surface 36 may be part of a garage, part of an outdoors roadway, or may be any other suitable path on which target device 14 and charging device 20 can travel. Motors in charging device 20 may be used to rotate and steer wheels 24 to move charging device 20 in a desired direction.

Computer-controlled motors or other actuators such as positioner 26 may be used in positioning structures within charging device 20. For example, positioner 26 may be used in positioning wireless power transfer element 28. Positioner 26 may position element 28 by tilting, raising and lowering, and/or rotating element 28. In configurations in which charging device 20 includes a battery for transferring power to target device 14, a battery loading and unloading device may be used to load and unload fresh batteries from a rack of available pre-charged batteries (as an example). A motor or other actuator may, if desired, be used to control cord management system 22 under control of control circuitry in charging device 20. System 22 may have a motorized rotating reel or other equipment that can be used to retract power cord 18 into charging device 20 or to deploy power cord 18 onto surface 36 (i.e., by feeding cord 18 out of an opening in charging device 20). The motors or other electrically controlled components that rotate and steer wheels 24 and otherwise control the movement of charging device 10 may sometimes be referred to herein as the movement system of charging device 20. Any suitable movement system may be used to control the movement of charging device 20 under the control of control circuitry within charging device 20 (e.g., a movement system based on electric drive motors for wheels 24 and a linear actuator coupled to a steering rack that turns wheels 24 in desired directions, etc.).

Base station 16 may be used as part of system 12. With one illustrative configuration, base station 16 may be used to recharge a power transfer battery in charging device 20 or may be used to supply charging device 20 with a freshly charged battery from an array of batteries in base station 16 (e.g., batteries that are charged using wall outlet power in base station 16). With the configuration of FIG. 1, power is supplied from base station 16 to charging device 20 using a path such as power cord 18. If desired, wired power transfer arrangements such as arrangements in which charging device 20 and target device 14 have mating connectors may be used in transferring power to equipment 14. The use of wireless power transfer equipment (e.g., inductive power transfer equipment) such as wireless power transfer elements 38 and 30 is merely illustrative.

Figure 2:
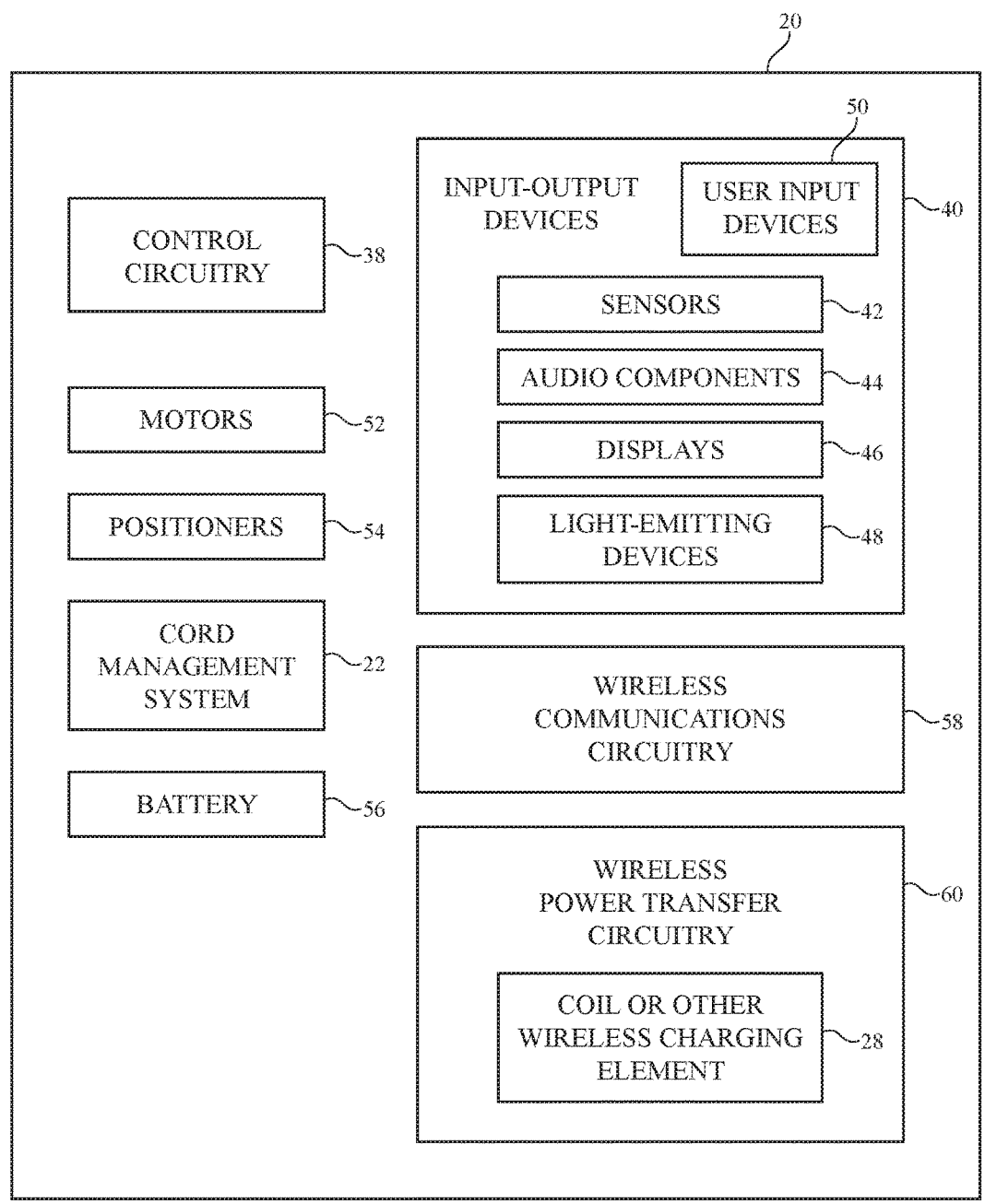
FIG. 2 is a schematic diagram of an illustrative charging device in accordance with an embodiment.

A schematic diagram of illustrative components that may be provided in charging device 20 is shown in FIG. 2. As shown in FIG. 2, charging device 20 may include control circuitry 38. Control circuitry 38 may include microprocessors, memory (e.g., volatile and nonvolatile storage), application-specific integrated circuits, and other storage and processing circuitry. Code that is implemented on control circuitry 38 may be used in controlling the motion of charging device 20, aligning wireless power transfer element 38 with external equipment, processing sensor data and other inputs to avoid foreign objects, controlling wireless and/or wired charging operations and/or other power transfer operations, and in performing other functions associated with the operation of charging device 20.

Input-output devices 40 may be used in gathering input from a user and/or making measurements on the environment surrounding charging device 20 and/or may be used in supplying output to a user and/or equipment in the vicinity of charging device 20. Control circuitry 38 may process the information obtained by input-output devices 40 and may provide input-output devices 40 with output.

As shown in FIG. 2, input-output devices 40 may include user input-output devices 50. Devices 50 may include buttons, touch sensors, track pads, keyboards, and other components for receiving input from a user. Sensors 42 may be used in controlling the motion of charging device 20, performing alignment operations, avoiding foreign objects, and/or receiving user input. Sensors 42 may include light-based sensors for detecting ambient light, light-based proximity sensors for detecting objects in the vicinity of charging device 20, magnetic sensors, temperature sensors, accelerometers and other position and/or motion sensors, acoustic sensors, gas sensors, humidity sensors, cameras (e.g., visible, infrared, and/or ultraviolet image sensors), compasses, and other sensors. Audio components 44 may include speakers and other components for producing audio output, acoustic sensors such as microphones for gathering input from a user (e.g., voice commands) and/or for measuring ambient sounds. Displays 46 may include touch screens and/or displays that are insensitive to touch. Light-emitting diodes, lamps, lasers, and other light-emitting devices 48 may be used to provide a user with output and/or may be used as part of a sensor system (e.g., a system that identifies the location of charging device 20 and/or other objects). Wireless communications circuitry 58 may be used to transmit and/or receive radio-frequency wireless signals (e.g., Bluetooth® signals, WiFi® signals, other wireless signals, etc.), light-based wireless signals, and/or other wireless signals. Data may also be communicated over wired paths. Wireless power transfer circuitry 60 may include wireless power transfer element 28 (e.g., a coil, etc.) for use in wirelessly transmitting power from charging device 20 to target equipment 14.

Charging device 20 may have motors such as motors 52 for steering and rotating wheels 24 (FIG. 1) and thereby moving charging device 20 in a desired direction. Positioners 54 (see, e.g., positioner 26 for positioning wireless power transfer element 28) may adjust an arm or other movable member that is used in positioning other element 28 or for otherwise moving structures associated with charging device 20. A loading and unloading device (e.g., a motorized rack, etc.) may, for example, be used in loading and unloading batteries into charging device 20. A motorized spool may be used in controlling the position of cord 18 (e.g., when plugging a plug on the end of cord 18 into a mating receptacle in equipment 14). Cord management system 22 may, for example, include a powered retractable reel (see, e.g., FIG. 1) or other equipment for retracting and dispensing cord 18. Battery 56 may include one or more batteries for providing charging device 20 with backup power (e.g., backup power for powering charging device 20 during the process of loading and unloading energy transfer batteries) and/or for storing energy that is to be transferred from charging device 20 to equipment 14 (wirelessly or via a wired connection). The operation of equipment such as motors 52, positioners 54, cord management system 22, circuitry for controlling battery 56, input-output devices 40, wireless communications circuitry 58, and power transfer circuitry 60 may be controlled using control circuitry 38. If desired, other electrical components may be provided in charging device 20 and/or one or more of the components of FIG. 2 may be omitted. The configuration of FIG. 2 is merely illustrative.

Base stations such as base station 16 may be provided in locations that are close to parking spaces (e.g., in home garages, in public garages and parking lots, etc.) or other locations in the vicinity of equipment in need of receiving power. Base stations 16 may receive wall outlet power at any suitable voltage and may transfer this power to equipment 12 wirelessly, using a wired connection, by shuttling power via a battery, etc.

Figure 3:
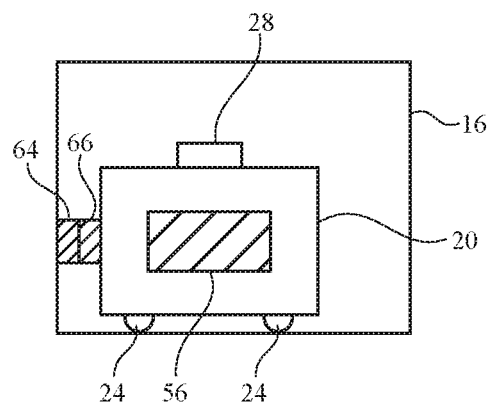
FIGS. 3, 4, and 5 are diagrams of illustrative base stations for providing a charging device with a recharged battery in accordance with embodiments.
Figure 4:
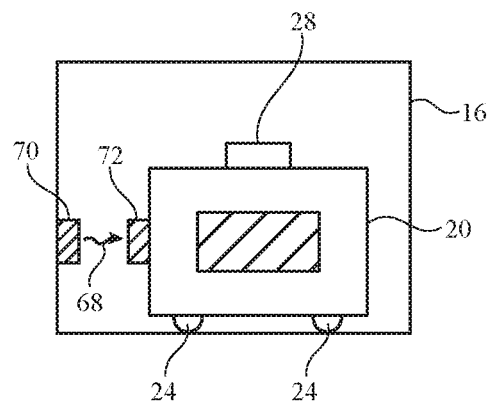
Figure 5:
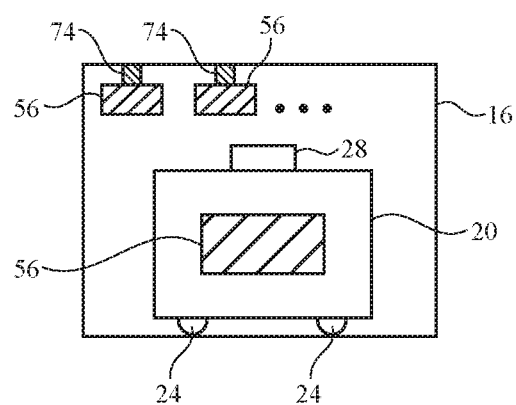

Illustrative arrangements for using batteries to provide power to equipment 12 (e.g., charging device 20) from base station 16 are shown in FIGS. 3, 4, and 5.

In the example of FIG. 3, base station 16 has a power source such as power source 64. Power source 64 may be a wall outlet that mates with a corresponding connector such as connector 66 in charging device 20. Using this arrangement, mains power can be transferred to charging device 20 to charge internal battery 56. Once battery 56 has been charged, charging device 20 can be moved in alignment with equipment 14, so that the energy from battery 56 can be transferred to battery 34 of equipment 14 wirelessly or via a wired connection (see, e.g., power transfer element 28).

In the example of FIG. 4, base station 16 has a power source such as power source 70. Power source 70 of FIG. 4 may be a wall outlet with wireless power transfer circuitry that transfers power wirelessly to wireless power reception equipment 72 in charging device 20. Using this arrangement, wall power can be transferred to charging device 20 to charge internal battery 56. Charging device 20 can then be moved in alignment with target device 14, so that the energy from battery 56 can be transferred to battery 34 of target device 14 wirelessly or via a wired connection.

With the illustrative arrangement of FIG. 5, circuits 74 may contain a source of power such as a wall outlet and associated battery charging circuitry to charge a bank of spare batteries 56. Charging device 20 can be moved into alignment with target device 14 and the battery 56 within charging device 20 can be used to charge battery 34 in target device 14 via wired or wireless charging. Once battery 56 in charging device 20 has been depleted, charging device 20 can return to base station 16 and can swap the depleted battery for one of the freshly charged batteries 56 in base station 16. Positioners 54 of charging device 20 (FIG. 2) or computer-controlled positioners associated with base station 16 may be used to swap batteries.

Figure 6:
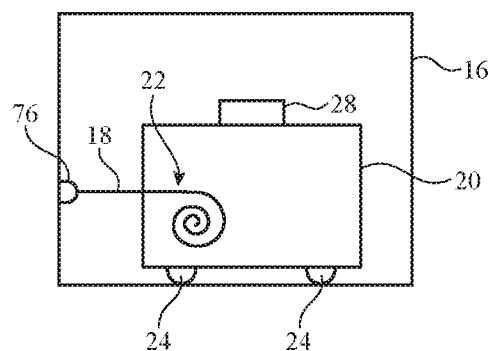
FIGS. 6 and 7 are diagrams of illustrative base stations for providing a charging device with corded power in accordance with an embodiment.
Figure 7:
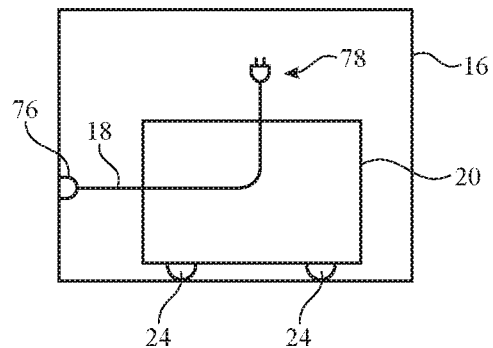

FIGS. 6 and 7 show illustrative arrangements in which charging device 20 may use a power cord such as power cord 18 in transferring power to battery 34 of equipment 14.

In the example of FIG. 6, cord 18 is coupled to a power source such as wall outlet 76. Wall outlet 76 can provide power to cord 18. Cord management system 22 may be used to retract and deploy cord 18 as charging device 20 moves relative to base station 16 and equipment 14. When aligned with target device 14, charging device 20 can transfer power from cord 18 to target device 14 wirelessly (via element 28) or via a wired connection.

In the illustrative configuration of FIG. 7, cord 18 is coupled to a power source such as wall outlet 76 that provides power to cord 18. Charging device 20 of FIG. 7 may include a cord management system (see, e.g., cord management system 22 of FIG. 2) that is used to retract and deploy cord 18 as charging device 20 moves relative to base station 16 and equipment 14. Charging device 20 may also have a positioner such as positioner 54 that is used in placing plug (connector) 78 of cord 18 into a mating receptacle (connector) in target device 14 when charging device 20 is adjacent to target device 14. After coupling the connector on power cord 18 with a connector in target device 14, positioner 54 may release cord 18 from charging device 20 (i.e., cord 18 of FIG. 7 may be a releasable cord that is not permanently attached to charging device 20). With an arrangement of the type shown in FIG. 7, a single piece of equipment such as charging device 20 may be used to couple multiple power cords to respective pieces of equipment such as multiple target devices 14.

When aligned with target device 14, charging device 20 can transfer power from cord 18 to target device 14 wirelessly (via element 28) or via a wired connection. FIGS. 8, 9, 10, and 11 show illustrative power transfer scenarios in which charging device 20 and the power transfer components of charging device 20 have been aligned with corresponding power transfer components in target device 20. In these illustrative scenarios, charging device 20 is moved under the body of target device 14 (e.g., charging device 20 may be moved under the body of a vehicle in scenarios in which target device 14 is a vehicle). This helps ensure that charging device 20 will not be visible and/or will not intrude on the movement of people or items in the vicinity of target device 14. Other arrangements for placing charging device 20 adjacent to target device 14 during power transfer operations may be used, if desired.

Figure 8:
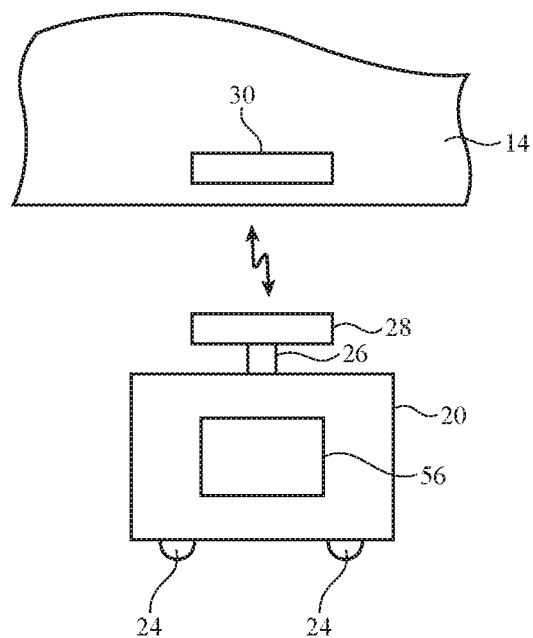
FIG. 8 is a side view of an illustrative charging device that is wirelessly transferring power from a battery in the charging device to a target device in accordance with an embodiment.

In the illustrative configuration of FIG. 8, charging device 20 has been moved under target device 20 so that wireless power transfer element 28 is aligned with wireless power transfer element 30 of equipment 14. Charging device 20 may align element 28 with element 30 using wheels 24 and/or positioner 26. Once aligned, power can be wirelessly transferred from battery 56 in charging device 20 to target device 14.

Figure 9:
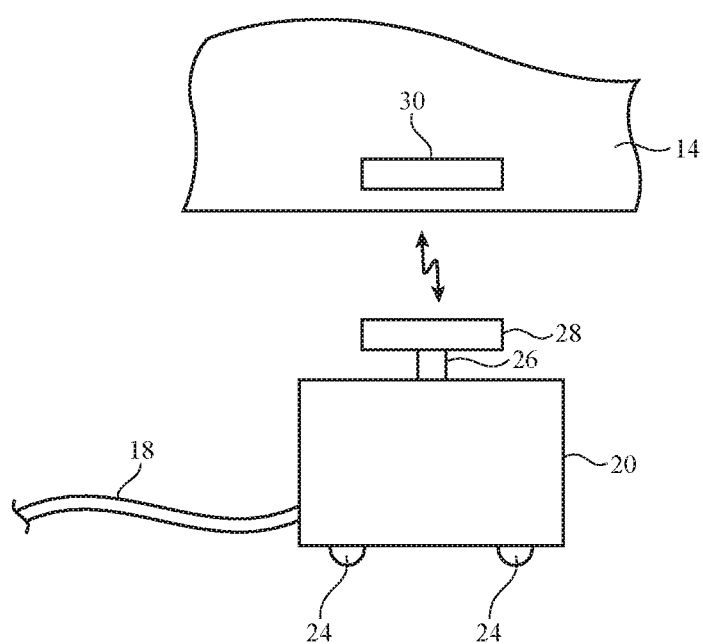
FIG. 9 is a side view of an illustrative charging device that is wirelessly transferring power to a target device using a power cord coupled to the charging device in accordance with an embodiment.

In the arrangement of FIG. 9, power cord 18 may be used to supply charging device 20 with power, so battery 56 may be omitted (or may be retained for use as a backup battery).

After aligning wireless power transfer element 28 with element 30 of target device 14 using wheels 24 and/or positioner 26 (e.g., using positioner 26 to tilt, rotate, and/or shift the position of element 28 to align with element 30), charging device 20 may wirelessly transfer power that has been received from a wall outlet in base station 16 via cord 18 to target device 14.

Figure 10:
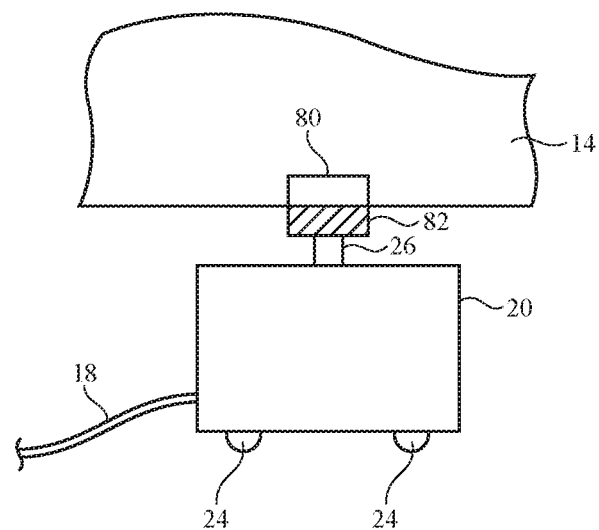
FIG. 10 is a side view of an illustrative charging device that is transferring power to a target device using a power cord coupled to the charging device and a wired connection between the charging device and a target device in accordance with an embodiment.

A wired power transfer approach is illustrated in FIG. 10. In the scenario of FIG. 10, charging device 20 receives power from base station 16 via power cord 18. Charging device 20 may use wheels 24 and/or positioner 26 to align and mate connector 82 of charging device 20 with corresponding connector 80 of equipment 14. Connectors 80 and 82 may include power plug and receptacle structures that allow power to be transferred using a wired connection between charging device 20 and target device 14. With the illustrative configuration of FIG. 10, charging device 20 may remain adjacent to target device 14 during power transfer operations.

Figure 11:
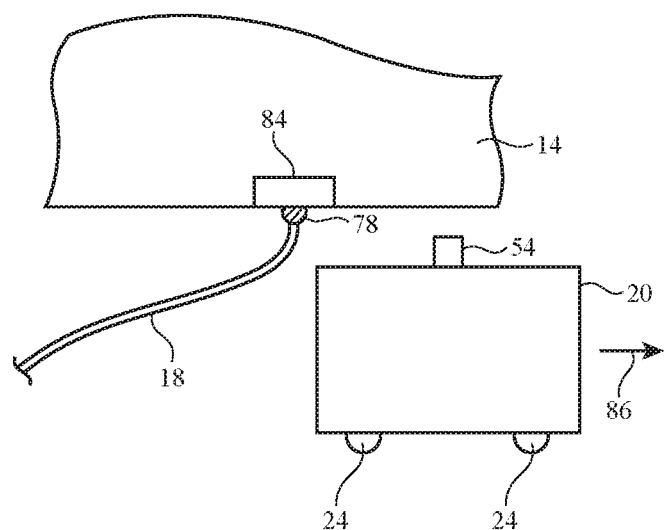
FIG. 11 is a side view of an illustrative charging device that has coupled a detachable cord to a target device to transfer power to the target device in accordance with an embodiment.

In the illustrative arrangement of FIG. 11, power cord 18 is detachable and need not remain affixed to charging device 20. As shown in FIG. 11, for example, charging device 20 may move away from equipment 14 in direction 86 after positioner 54 of charging device 20 aligns connector 78 with mating connector 84 of equipment 14 and couples connector 78 of power cord 18 with mating connector 84. Charging device 20 may be used to couple numerous power cords to the connectors of multiple pieces of equipment such as multiple target devices 14 and need not remain in the vicinity of any particular target device 14 during charging.

Figure 12:
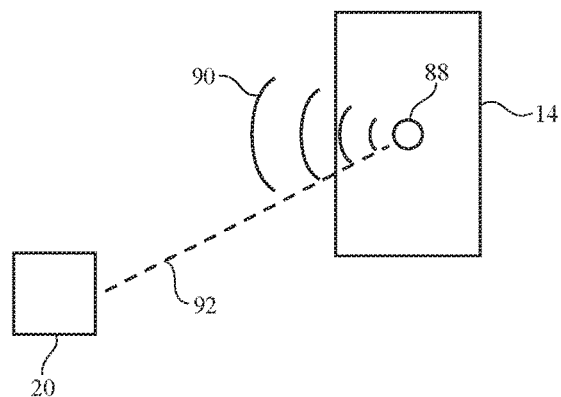
FIG. 12 is a diagram of an illustrative charging device that is using a sensor system to locate a target device in accordance with an embodiment.

It may be desirable for charging device 20 and/or target device 14 to include components that help guide charging device 20 to target device 14. As shown in FIG. 12, target device 14 may include a beacon such as beacon 88. Beacon 88 or an array of beacons 88 may be mounted on target device 14 (e.g., on a vehicle), may be mounted in a parking space in which target device 14 is located, or may be placed at other suitable locations in the vicinity of device 14. Each beacon 88 may emit wireless signals 90 that are detected by sensors in equipment 90. Wireless signals 90 may include radio-frequency signals, light, acoustic signals (sound) or other wireless signals. Using triangulation techniques, by analyzing received signal strength information, and/or using other techniques, charging device 20 can determine an appropriate path such as path 92 to follow when moving charging device 20 towards target device 14. For example, control circuitry in device 20 may be configured to gather emitted wireless beacon signals from multiple beacons in the vicinity of device 20 and to determine path 92 using triangulation based on the gathered wireless beacon signals.

If desired, target device 14 and/or other equipment in system 10 may be used in formulating a request for receiving power from charging device 20. The request may be generated by charging device 20 or other equipment (e.g., equipment in base station 16 or elsewhere in a parking lot or other facility containing base station 16) in response to detection of target device 14 and, if desired, in response to additional criteria such as information on whether battery 34 in equipment 14 is in need of charging. For example, target device 14 may obtain information on its location within a parking lot by reading a bar code, by using pattern recognition techniques to identify a parking space number, by using radio-frequency identification (RFID) techniques to determine a parking space number or other location information, by using non-light-based sensors such as magnetic sensors, acoustic sensors, or other sensors to obtain location information, or by using other sensors in target device 14 and/or elsewhere in system 10 to determine the location of target device 14. A user of target device 14 may, if desired, by prompted to supply location information for target device 14 (e.g., by entering a voice command through a voice recognition interface in target device 14, by manually typing or otherwise inputting location information into target device 14 or equipment in system 10 that is external to target device 14, etc.). Information on the presence and location of target device 14 may also be gathered using parking space sensors (magnetic sensors, radio-frequency identification readers, light-based sensors, cameras, acoustic sensors, etc.) or sensors elsewhere in a parking lot or other facility.

Based on information gathered by target device 14, information supplied by a user, information gathered using sensors in a parking lot or other facility, information gathered by charging device 20, and/or information supplied and/or gathered using other equipment in system 10, a request for receiving power from charging device 20 can be formulated. This request may be transmitted to charging device 20 via wired and/or wireless connections and may include information on the location of target device 14 and other information (battery charge state, request priority, financial information for payment of fees associated with receiving power, etc.). In response to receiving the request, charging device 20 may determine an appropriate path for equipment 20 and may move charging device 20 to target device 14 along this path.

Figure 13:
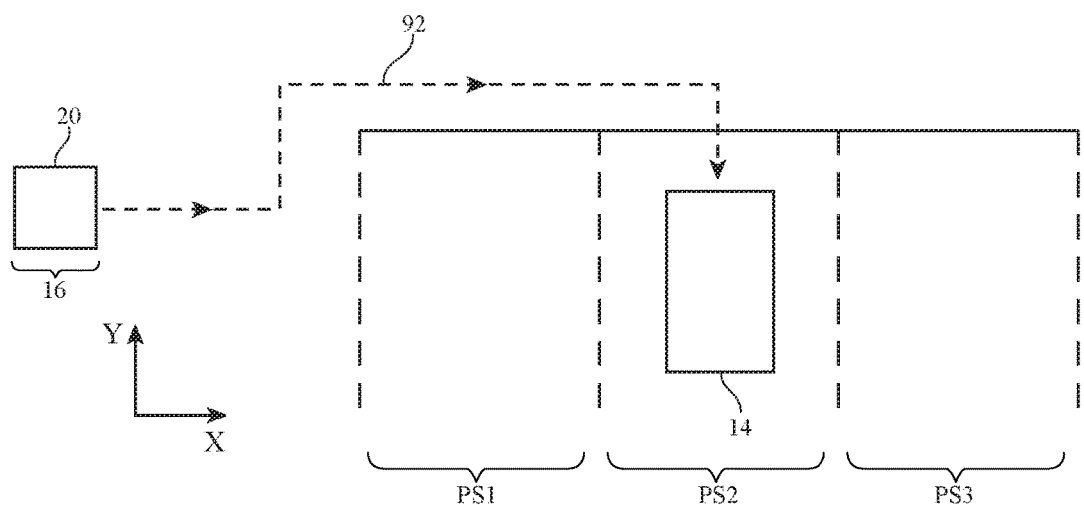
FIG. 13 is a diagram of an illustrative charging device that is being directed towards a target device using predefined route information in accordance with an embodiment.

An illustrative request-based scenario for moving charging device 20 towards target device 14 is illustrated in FIG. 13. In the example of FIG. 13, target device 14 is a vehicle in a parking lot that includes three parking spaces PS1, PS2, and PS3. Charging device 20 has been provided with information (e.g., position information in dimensions X and Y) on the location of each parking space and the areas surrounding the parking spaces. In the FIG. 13 example, vehicle 14 has parked in parking space PS2 and a request for receiving power from equipment 20 has been provided to charging device 20. Based in knowledge of the location of vehicle 14 and the current location of charging device 20 (e.g., in base station 16), charging device 20 can identify an appropriate route for path 92 and can travel along path 92 to vehicle 14.

Figure 14:
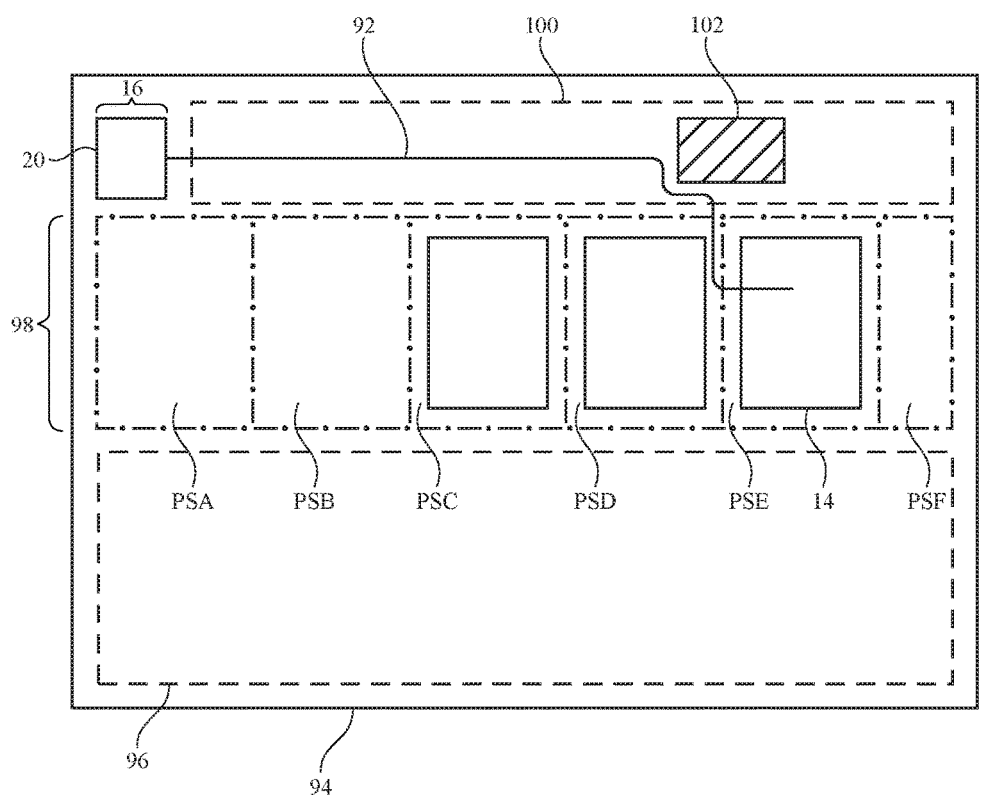
FIG. 14 is a diagram of an illustrative system environment in which a charging device is following a path to a target device in accordance with an embodiment.

In determining appropriate paths to follow, charging device 20 may take into account the nature of the various areas surrounding target device 14. Consider, as an example, a parking lot environment of the type shown in FIG. 14. As shown in FIG. 14, parking lot 94 may contain a parking space area such as parking space area 98. Parking space area 98 may contain parking spaces such as parking spaces PSA, PSB, PSC, PSD, PSE, and PSF. Vehicles can be parked in these parking spaces. In the example of FIG. 14, vehicles have been parked in parking spaces PSC and PSD and target vehicle 14 has been parked in parking space PSE.

Some areas of parking lot 94 such as area 96 are active vehicle paths and are not available for use by charging device 20. Other areas such as border area 100 are optimal for travel by charging device 20. Areas such as area 100 of FIG. 14 may, for example, be blocked to traffic using a traffic barrier. Pedestrians may also be prohibited from entering area 100 (e.g., using signs and/or fences). Charging device 20 may be allowed to travel in other portions of parking lot 96 such as parking space area 98, but may wish to do so only in limited circumstances (e.g., to avoid interfering with people entering and exiting vehicles, to avoid laying power cords where people may desire to walk, etc.). In determining an optimal route for path 92 between base station 16 and target device 14, charging device 20 may take into account the level of desirability (e.g., the "cost") associated with traveling in each of multiple different areas in parking lot 94. With this type of approach, prohibited areas may be associated with high (e.g., infinite) cost, desired area 100 may be provided with a zero cost or other low cost, and intermediate areas such as area 98 may be provided with correspondingly intermediate levels of cost. Using a cost function (e.g., a function that can be evaluated to minimize the "cost" associated with traveling through various areas), charging device 20 can determine an optimal route for path 92.

In some scenarios, fixed and/or moving obstacles may interfere with the movement of charging device 20. For example, a foreign object such as foreign object 102 may be present or may become present in parking lot 94 during movement of charging device 20. In situations in which foreign object 102 is present and detectable by the sensors of charging device 20 or other equipment in system 10 before path 94 is determined, foreign object 102 can be avoided in advance (e.g., by providing the area occupied by object 102 with a high cost value in a cost function during route planning operations). In other situations, such as scenarios in which foreign object 102 moves into a planned path for charging device 20 while charging device 20 is actively moving towards target device 14, foreign object avoidance techniques may be used to ensure that charging device 20 does not collide with foreign object 102.

In the example of FIG. 14, path 92 avoids foreign object 102, maximizes use of optimal travel area 100, avoids use of forbidden travel area 96, and minimizes use of parking space area 98. Other routes for paths such as path 92 of FIG. 14 may be used, if desired. Moreover, parking lots and other areas may be provided with any suitable number of different areas each having a respective cost value (e.g., parking lot 94 may be divided into two or more zones, three or more zones, ten or more zones, hundreds of zones, or any other suitable number of zones each of which has a potentially different level of "path cost" associated with an optimal path determination cost function). The use of a parking lot with three different levels of permissibility for travel by charging device 20 in the example of FIG. 14 is merely illustrative.

Once charging device 20 is adjacent to target device 14 (e.g., when charging device 20 is located under a wireless or wired charging port in a vehicle or other target device 14), charging device 20 may use sensors and other equipment to help align power transfer components in devices 20 and 14. Alignment operations may be performed using sensors, mechanical interlock features, and other alignment equipment.

FIGS. 15, 16, 17, 18, 19, and 20 are diagrams of illustrative structures and components that may be used by charging device 20 in performing alignment operations. In the examples of FIGS. 15, 16, 17, 18, 19, and 20, part of the alignment equipment has been implemented in equipment 104 and a corresponding part of the alignment equipment has been implemented in equipment 106. Equipment 104 may form part of charging device 20 and equipment 106 may form part of target device 14, equipment 106 may form part of charging device 20 and equipment 104 may form part of target device 14, or target device 14 and charging device 20 may each include equipment such as equipment 104 and 106.

Figure 15:
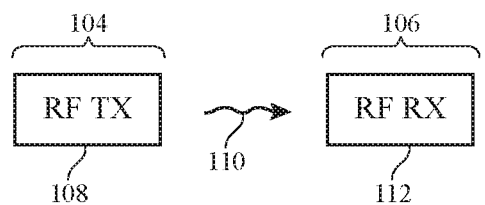
FIGS. 15, 16, 17, 18, 19, and 20 show illustrative equipment that may be used in aligning a charging device and a target device in accordance with an embodiment.

In the example of FIG. 15, equipment 104 has a transceiver such as radio-frequency transmitter 108. Radio-frequency transmitter 108 may emit wireless signals 110 (e.g., beacon signals, etc.) at any suitable frequency. A corresponding transceiver such as radio-frequency receiver 112 in equipment 106 can detect the location and strength of signals 110 and can use these signals to help align equipment 104 and 106 (e.g., using triangulation techniques, received signal strength measurements, etc.). Receiver 112 may include one or more antennas (e.g., antennas located at suitably spaced locations to provide enhanced resolution to the radio-frequency signal alignment process).

Figure 16:
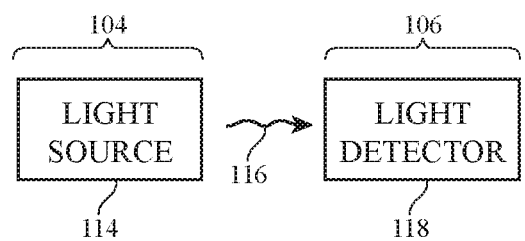

FIG. 16 is a diagram of an illustrative light-based system. In the FIG. 16 arrangement, equipment 104 includes a light source such as light source 114. Light source 114 may emit light 116 at any suitable wavelength (infrared, visible, and/or ultraviolet) and may include one or more lasers, light-emitting diodes, lamps, or other light emitting components. Light detector 118 may include one or more photodetectors, cameras, or other components that measure the direction, strength, and other attributes of light 116 to help align equipment 104 to equipment 106.

Figure 17:
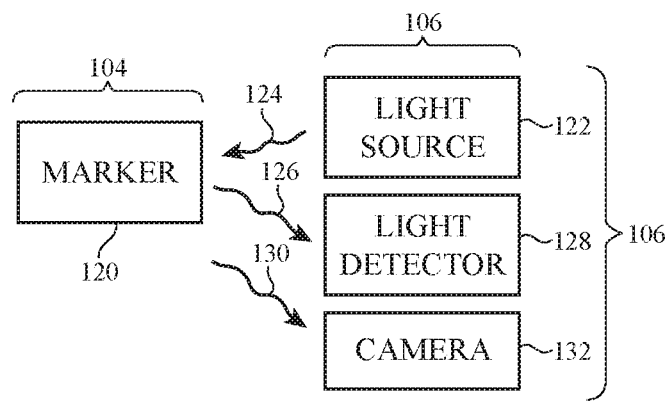

In the scenario of FIG. 17, equipment 104 has a visual marker such as maker 120. Light source 122 may emit light 124 that illuminates marker 120 and that is reflected towards equipment 106 as reflected light 126 and 130. Light 126 may be detected using light detector 128 in equipment 106 (e.g., one or more photodiodes, etc.). Light 130 may be detected using alight sensing component such as camera 132 (e.g., one or more digital image sensors in equipment 106). By processing the signals gathered by light detector 128 and/or camera 132, equipment 106 can determine the location of marker 120 and thereby align equipment 104 to equipment 104. Marker 120 may include a black-and-white target or other high contrast target, a bar code, a color-coded area, alignment fiducials, and/or other encoded visual information. Light may also be reflected off of structures in equipment 104 other than marker 120 to help in alignment operations.

Figure 18:
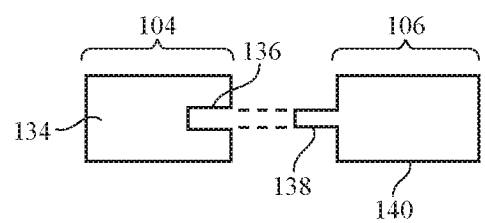

FIG. 18 shows how physical alignment features may be used to assist in alignment operations. Structure 134 in equipment 104 may have an alignment structure such as recess 136 and structure 140 in equipment 106 may have a mating alignment structure such as protrusion 138. Grooves, recesses, angled surfaces and/or other features may be used to help promote insertion of alignment feature 138 into alignment feature 136. When coupled together, the physical alignment structures of FIG. 18 may help ensure that equipment 104 and 106 has been properly aligned.

Figure 19:
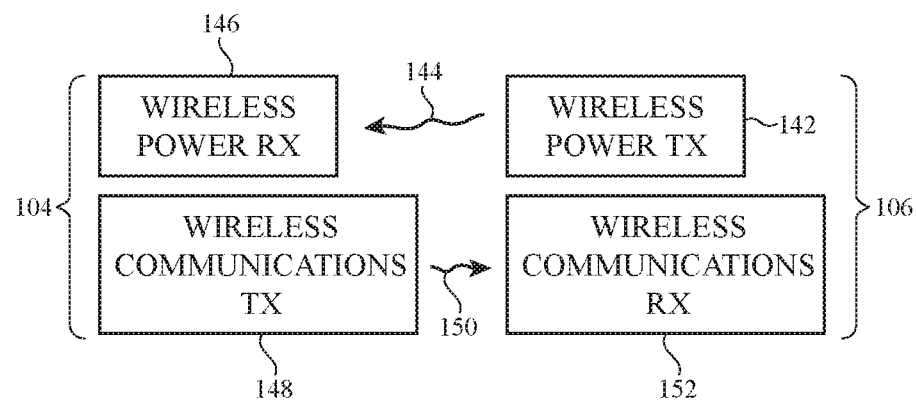

In the arrangement of FIG. 19, equipment 106 includes wireless power transmission circuitry 142 that wirelessly transmits wireless power signals 144 to corresponding wireless power receiver circuitry 146 in equipment 104. When wireless power transmitter 142 and wireless power receiver 146 are well aligned, power will be transferred efficiently. When transmitter 142 and receiver 146 are misaligned, power transfer efficiency will drop. Equipment 104 may evaluate the quality of power transfer from transmitter 142 to receiver 146 and can provide corresponding wireless feedback information to equipment 106. For example, information indicating how well equipment 104 and 106 are aligned may be transmitted wirelessly from equipment 104 to equipment 106 using wireless communications transceiver circuitry 148 (e.g., a wireless transmitter) to transmit wireless communications signals 150 to wireless communications transceiver circuitry 152 (e.g., a wireless receiver). If desired, bidirectional communications may be used in conveying information about power transfer efficiency and alignment.

Figure 20:
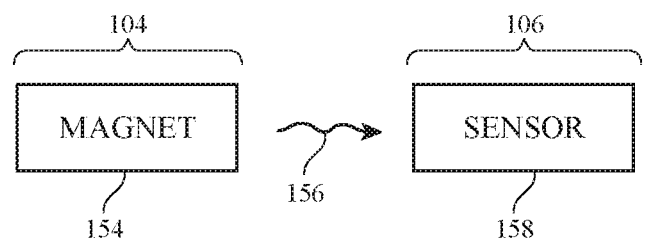

Magnetic alignment equipment may also be used to help align equipment 104 and equipment 106. As shown in FIG. 20, for example, equipment 104 may have one or more magnets such as magnet 154 that emit magnetic fields 156.

Equipment 106 may contain one or more magnetic sensors such as sensor 158 for detecting magnetic fields 156. Equipment 104 and 106 may be aligned by aligning sensor 158 relative to magnet 154.

If desired, one or more alignment components of the type shown in FIGS. 15, 16, 17, 18, 19, and 20 may be used together to improve alignment efficiency and/or accuracy and these components may be used in conjunction with other alignment components. The alignment components of FIGS. 15, 16, 17, 18, 19, and 20 are merely illustrative.

Figure 21:
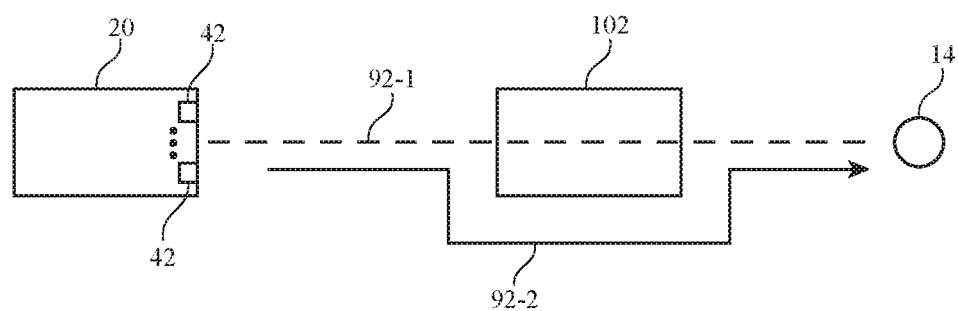
FIG. 21 is a diagram showing how a charging device may dynamically avoid foreign objects in accordance with an embodiment.

Charging device 20 may include components to help avoid contact between charging device 20 and foreign objects. For example, charging device 20 may include foreign object detection sensors to perform real-time foreign object detection operations. If a foreign object is detected in the intended path of charging device 20, charging device 20 can update the path to avoid the foreign object. As shown in FIG. 21, for example, charging device 20 may be moving towards target equipment 14 along a path such as path 92-1. While moving along path 92-1, foreign object 102 may move into a position that overlaps path 92-1. Sensors 42 may be used to detect the presence of foreign object 102. When object 102 is detected, charging device 20 can determine and follow an updated path such as path 92-2 towards object 14.

Sensors 42 may detect foreign objects using lasers or other light emitters and light sensors (e.g., lidar, etc.), may detect foreign objects using ultrasonic position sensors and other acoustic object detection sensors, may detect sensors using radio-frequency signals (e.g., radar, etc.), may detect sensors using cameras and other light detectors (e.g., light detectors that detect ambient light and/or emitted light from charging device 20, camera-based motion sensors and other light-based motion sensors that evaluate light signals to detect motion, infrared cameras and other infrared detectors for detecting objects such as living things that emit heat, cameras that detect objects using pattern recognition processes, etc.), may include temperature sensors, magnetic sensors (e.g., for detecting ferromagnetic foreign objects), touch sensors, mechanical sensors such as switches that close when coming into physical contact with foreign object 102, strain gauges for detecting contact with external objects, accelerometers that detect deceleration of equipment 20 due to contact with object 102, microphones that detect changes in ambient noise levels when charging device 20 comes into close proximity to object 102, or other equipment for detecting the presence of objects such as object 102.

Figure 22:
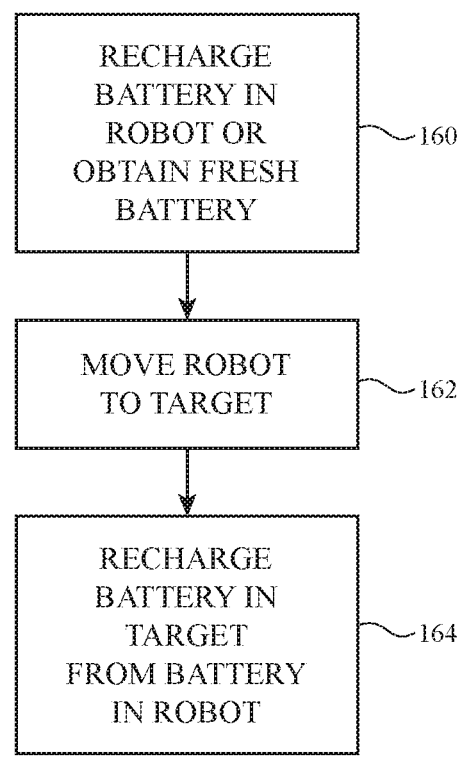
FIG. 22 is a flow chart of illustrative steps involved in using a charging device with a battery to deliver power to a target device in accordance with an embodiment.

Illustrative steps involved in using charging device 20 to transfer energy from a power source in a location such as base station 16 to target device 14 are shown in FIG. 22. At step 160, charging device 20 may receive a fresh battery 56 from base station 16 as described in connection with FIG. 5 or may receive wired power (FIG. 3) or wireless power (FIG. 4) to recharge battery 56 in charging device 20. After ensuring that battery 56 in equipment 160 is charged, charging device 20 may be moved to the vicinity of target device 14 (step 162). In particular, charging device 20 may use a cost function analysis to determine a desired path 92 to target device 14 and/or may select from one or more predefined satisfactory paths 92 to follow to target device 14. Foreign objects may be avoided by using sensors in charging device 20, as described in connection with FIG. 21. At step 164, the energy from battery 56 in charging device 20 may be transferred to battery 34 in target device 14. Power may be transferred to battery 34 using a wired connection (e.g., mating connectors in devices 20 and 14) or wirelessly, as described in connection with FIG. 8.

Figure 23:
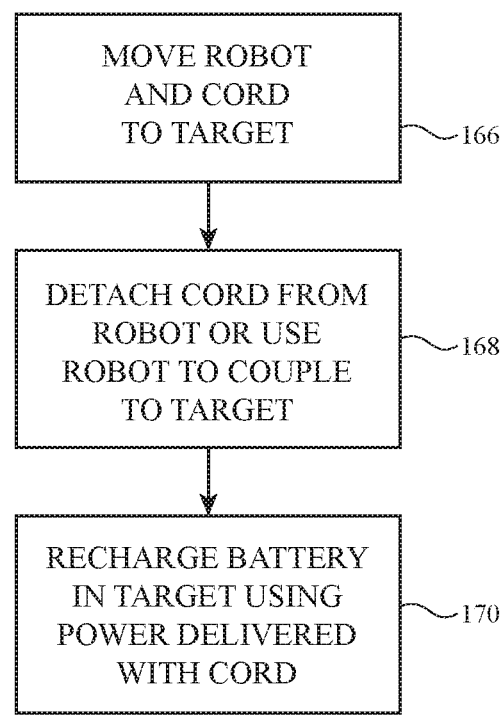
FIG. 23 is a flow chart of illustrative steps involved in using a charging device to assist in the delivery of power to a target device through a power cord in accordance with an embodiment.

Illustrative steps involved in providing power to target device 14 using power cord 18 are shown in FIG. 23. At step 166, charging device 20 and power cord 18 may be moved to target device 14. Charging device 20 may follow an optimum path (e.g., path 92) in moving to target device 14 and may use cord management system 22 to dispense cord 18 along path 92. Foreign objects may be avoided by using sensors in charging device 20, as described in connection with FIG. 21. At step 168, charging device 20 may form a wired connection with target device 14 as described in connection FIG. 14, may form a wireless power transfer link with target device 14, as described in connection with FIG. 9, or may attach plug 78 on a detachable power cord to a corresponding connector in target device 14, as described in connection with FIG. 11. At step 170, power cord 18 may provide power to target device 14 to recharge battery 34.

Figure 24:
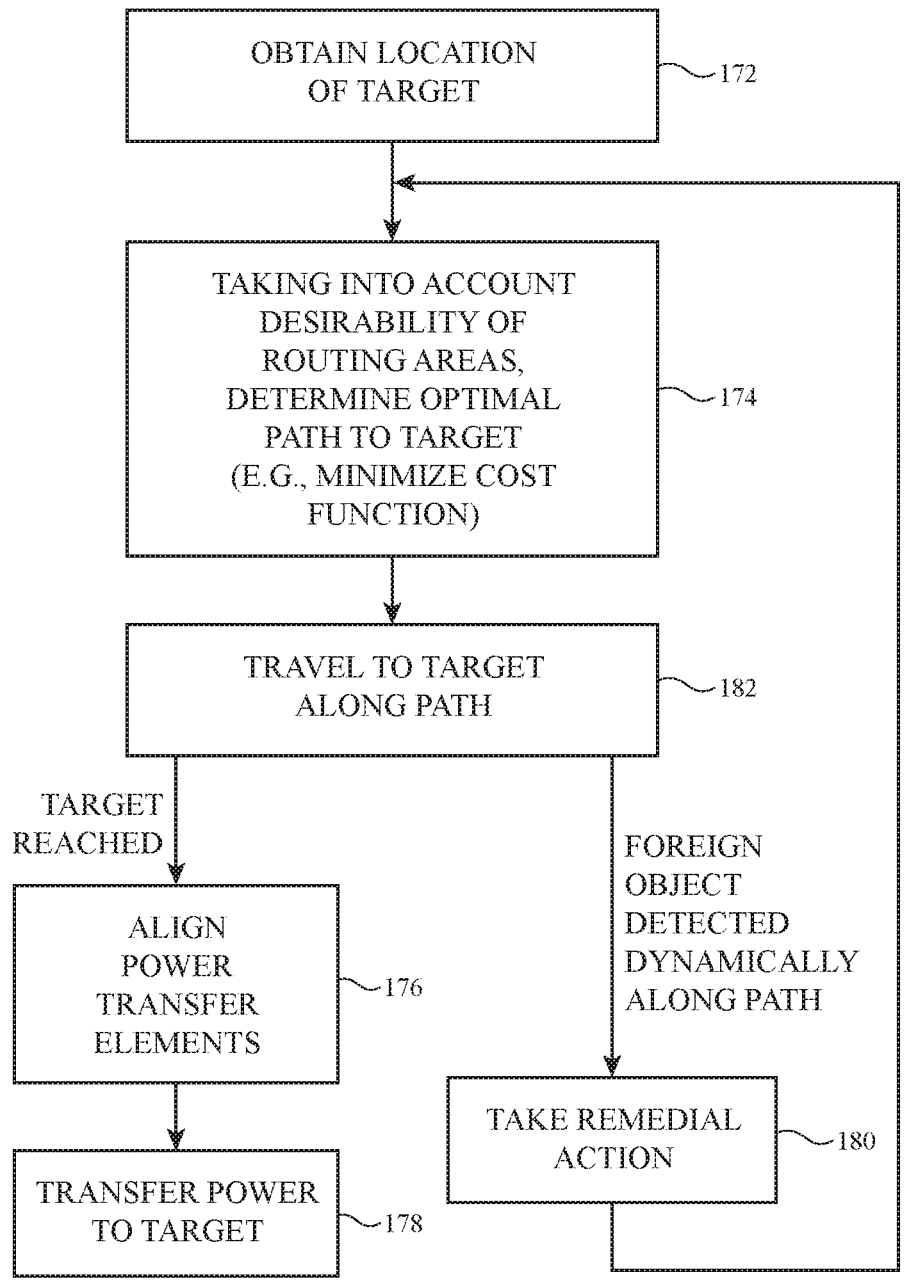
FIG. 24 is a flow chart of illustrative steps involved in using a charging device to transfer power to a target device while performing alignment and foreign object avoidance operations in accordance with an embodiment.

Illustrative steps involved in moving charging device 20 along an optimal path to target device 14 while avoiding foreign objects and performing alignment operations to facilitate power transfer are shown in FIG. 24. At step 172, a request from target device 14, sensor data, or other information may be received by charging device 20 to initiate power transfer operations. At step 174, charging device 20 may use a cost function or other arrangement to determine an optimal path such as path 92. In determining which path is optimal, charging device 20 can take account of which travel areas are prohibited (e.g., areas occupied by physical obstructions, areas frequented by vehicle traffic, etc.), which areas are preferred (e.g., safe out-of-the way areas), and which areas are permissible when necessary (e.g., areas around vehicles, etc.). Control circuitry 38 may be used in determining the route for path 92 using the cost function. At step 182, control circuitry 38 may control motors 52 for wheels, steering, and/or other motion control equipment in charging device 20 so that charging device 20 travels to target device 14 along path 92. In the event that a foreign object is detected along path 92, charging device 20 can compute an updated path (e.g., path 92-2 of FIG. 21) to avoid the foreign object, may stop all motion of charging device 20, may issue an error message or other message for a user (e.g., a wireless message such as a text message or other wireless alert, an email message, an audible message such as a warning tone or verbal message, etc.), may request manual intervention, or may take other suitable actions before computing another path to equipment 14 at step 174.

When target device 14 has been reached by charging device 20, alignment operations may be performed to align connectors and/or wireless power transfer elements in charging device 20 and target device 14. Alignment techniques of the type described in connection with FIGS. 15, 16, 17, 18, 19, and 20 and/or other suitable alignment techniques may be used during the alignment operations of step 176. At step 178, power can be transferred from a power cord or battery in charging device 20 to target device 14.

The operations of FIGS. 22, 23, and 24 may be performed by control circuitry 38 in device 20 (system 12) and/or control circuitry 32 in device 14. During operation, this control circuitry (which may sometimes be referred to as processing circuitry, processing and storage, computing equipment, a computer, etc.) may be configured to perform the methods of FIGS. 22, 23, and 24 (e.g., using dedicated hardware and/or using software code running on hardware in devices 20 and/or 14). The software code for performing these methods, which may sometimes be referred to as program instructions, code, data, instructions, or software, may be stored on non-transitory (tangible) computer readable storage media in control circuitry 38 and/or 32 in devices 20 and/or 14 such as read-only memory, random-access memory, hard drive storage, flash drive storage, removable storage medium, or other computer-readable media and may be executed on processing circuitry such as microprocessors and/or application-specific integrated circuits with processing circuits in control circuitry 38 and/or 32.

The foregoing is merely illustrative and various modifications can be made by those skilled in the art without departing from the scope and spirit of the described embodiments. The foregoing embodiments may be implemented individually or in any combination.

What is claimed is:

1. A device for providing power to a target device, comprising:
   a movement system;
   a power cord;
   wireless circuitry that is configured to gather wireless beacon signals;
   control circuitry that is configured to direct the movement system to move the control circuitry and power cord along a path on a surface based at least partly on the wireless beacon signals to deliver power from the power cord to the target device; and
   at least one sensor, wherein the control circuitry is configured to control the movement system to guide the control circuitry and power cord around foreign objects detected with the sensor.

2. The device defined in claim 1 further comprising a wireless power transfer element that is configured to transfer power wirelessly from the power cord to the target device.

3. The device defined in claim 2 wherein the wireless power transfer element comprises at least one coil that is configured to be inductively coupled to a wireless power transfer receiver in the target device.

4. The device defined in claim 3 wherein the movement system comprises at least one motor and wheels and wherein the control circuitry is configure to control the at least one motor to rotate at least one of the wheels.

5. The device defined in claim 1 further comprising a cord management system that is operable to retract and dispense the power cord under control of the control circuitry.

6. The device defined in claim 1 wherein the sensor comprises a sensor selected from the group consisting of: a radio-frequency signal sensor, a camera, a light detector, a temperature sensor, a motion sensor, a magnetic sensor, a touch sensor, a switch, a strain gauge, an accelerometer, and a microphone.

7. The device defined in claim 1 further comprising:
   a wireless power transfer element; and
   a positioner, wherein the control circuitry is configured to:
      control the positioner to align the wireless power transfer element with the target device; and
      use the wireless power transfer element to wirelessly transfer power from the power cord to the target device through the aligned wireless power transfer element.

8. The device defined in claim 7 further comprising at least one electrical component configured to supply signals to the control circuitry that the control circuitry uses to align the wireless power transfer element to the target device.

9. The device defined in claim 8 wherein the component comprises a radio-frequency transceiver.

10. The device defined in claim 8 wherein the component comprises a component selected from the group consisting of: a light detector and a light emitter.

11. The device defined in claim 8 wherein the component comprises a component selected from the group consisting of: a camera and a magnetic sensor.

12. The device defined in claim 7 further comprising a wireless communications device, wherein the control circuitry is configured to use the wireless communications device in aligning the wireless power transfer element to the target device.

13. The device defined in claim 7 wherein the target device has an alignment structure, the charging device further comprising an alignment structure that is configured to mate with the alignment structure in the target device to align the wireless power transfer element to the target device.

14. The device defined in claim 1 wherein the control circuitry is configured to use a cost function to determine a path for routing the power cord to the target device and wherein the cost function is used to determine the path based at least partly based on values assigned to different areas through which the power cord passes.

15. The device defined in claim 1 wherein the target device comprises a vehicle with a wireless power receiver element and wherein the charging device further comprises a wireless power transfer element that is configured to wirelessly transfer power from the power cord to the wireless power receiver element in the vehicle.

16. A charging device operable to provide power to a target device, comprising:
   a positioning system with wheels;
   a battery;
   control circuitry that is configured to control the positioning system to move the battery to the target device with the wheels and deliver power wirelessly to the target device from the battery; and
   sensors, wherein the control circuitry is configured to use the sensors to detect foreign objects as the battery is moved to the target device.

17. The charging device defined in claim 16 further comprising a wireless power transfer element configured to wirelessly transfer the power from the battery to the target device, wherein the control circuitry is configured to use the sensors to align the wireless power transfer element to the target device.

18. The charging device defined in claim 16 wherein the target device comprises a vehicle with a wireless power receiver element and wherein the charging device further comprises a wireless power transfer element that is configured to wirelessly transfer power from the battery to the wireless power receiver element in the vehicle.

19. A charging device operable to couple a power cord to a target device to provide power to the target device, comprising:
   wheels;
   control circuitry configured to control the wheels to move the power cord to the target device; and
   a positioner that is configured to mechanically couple the power cord to the target device to deliver power to the target device from the power cord.

20. The charging device defined in claim 19 wherein the target device has a first connector, wherein the power cord has a second connector, and wherein the control circuitry is configured to direct the positioner to couple the first connector to the second connector to deliver power to the target device through the first and second connectors, further comprising a cord management system that is operable to retract and dispense the power cord under control of the control circuitry, further comprising sensors, wherein the control circuitry is configured to use the sensors to detect foreign objects as the power cord is moved to the target device, wherein the control circuitry is configured to determine a path for routing the power cord to the target device.

* * * * *